United States Patent [19]

Tracy et al.

[11] Patent Number: 5,745,355
[45] Date of Patent: Apr. 28, 1998

[54] WIRELESS SELECTIVE TRIPPING OF AC POWER SYSTEMS CONNECTED IN PARALLEL

[75] Inventors: John G. Tracy, Raleigh; Frederick Tassitino, Jr., Wake Forest, both of N.C.

[73] Assignee: Exide Electronics Corporation, Raleigh, N.C.

[21] Appl. No.: 669,940

[22] Filed: Jun. 25, 1996

[51] Int. Cl.⁶ .................................. H02M 7/00; G05F 1/40
[52] U.S. Cl. ........................................... 363/71; 323/272
[58] Field of Search ............................. 323/272; 363/50, 363/71, 76, 95; 307/52; 361/79

[56] References Cited

U.S. PATENT DOCUMENTS

| | | | |
|---|---|---|---|
| 4,038,559 | 7/1977 | Chun et al. | 307/64 |
| 4,114,048 | 9/1978 | Hull et al. | 307/53 |
| 4,745,512 | 5/1988 | Hampson | 361/80 |
| 4,924,170 | 5/1990 | Henze | 323/272 |
| 5,122,726 | 6/1992 | Elliott et al. | 323/272 |
| 5,159,519 | 10/1992 | Cassidy et al. | 361/96 |
| 5,388,022 | 2/1995 | Ahuja | 361/94 |
| 5,446,645 | 8/1995 | Shirahama et al. | 363/71 |
| 5,473,528 | 12/1995 | Hirata et al. | 363/71 |
| 5,519,561 | 5/1996 | Mrenna et al. | 361/105 |

*Primary Examiner*—Stuart N. Hecker
*Attorney, Agent, or Firm*—Woodcock Washburn Kurtz Mackiewicz & Norris LLP

[57] ABSTRACT

A parallel redundant power supply system which does not use any inter-unit signaling is obtained by deriving all information necessary for a robust selective trip regime from the output signals of each respective power system. Each respective power system monitors its own power output and keeps a running average of its own performance to determine whether it is operating properly, rather than comparing itself to other units. The trip function is created by sampling the AC output voltage of the power system and multiplying an instantaneous difference in voltage (compared with a previous cycle) with the instantaneous difference in current (also compared with a previous cycle) of the power system's AC output power. If the two transients are in opposite directions, then the multiplicative product will be negative and indicative of a good power system. On the other hand, if the two transients are in the same direction, then the multiplicative product will be positive and indicative of a failed unit. The power system is removed from the power circuit when the multiplicative product is positive and greater than a predetermined trip value. The same technique may be used for self-monitoring of a single power supply connected to a load.

19 Claims, 7 Drawing Sheets

WIRELESS SELECTIVE TRIPPING OF AC POWER SYSTEMS CONNECTED IN PARALLEL

BACKGROUND OF THE INVENTION

1. Field of the Invention

The present invention generally relates to a method and apparatus for selectively tripping a failed uninterruptible power supply (UPS) off-line while any "good" UPSs connected in a redundant fashion remain on-line. More particularly, the present invention relates to a technique by which a "trip" signal is generated for redundant AC power systems based entirely on the digitized power output of the UPS without inter-unit signaling.

2. Description of the Prior Art

Connecting two or more uninterruptible power supplies (UPSs) in a parallel redundant fashion is a necessary requirement for those who need ever higher and higher power availability. However, in order for a UPS to be able to operate in a redundant fashion with other UPSs, it must have a robust "selective tripping" regime. As used herein, "selective tripping" refers to the set of hardware and associated software algorithms that causes a failed UPS to trip off-line while the "good" parallel redundant unit(s) stay on-line. As will be appreciated by those skilled in the art, the redundant capability of a system is only as good as its "selective tripping" regime.

There are two basic kinds of UPS failures in a parallel redundant system: those that do not cause a disturbance on the critical output bus connected to the load, and those that do. The first kind of failure is trivial since there is no disturbance on the critical bus; the good unit will not see the evidence of failure and will simply stay on-line doing its job. The failed unit is simply off-line by virtue of its failure. However, the second kind of failure is more problematic since all units see the fault but any good units must stay on-line. The present invention deals with selective tripping for the second type of failure, where it is necessary to distinguish the failed units from the "good" units.

When a UPS fails in a way that the critical bus is disturbed, then it is sourcing or sinking more current than can be absorbed or supplied by the other unit(s) which is on-line. Hence, all units see the critical bus disturbance and all units see excessive current. Yet, for selective tripping to work in this case, any good units must stay on-line and only the bad unit must trip off-line. If a good unit trips off-line instead, then any benefit of redundancy for this type of failure is lost.

Figure 1:
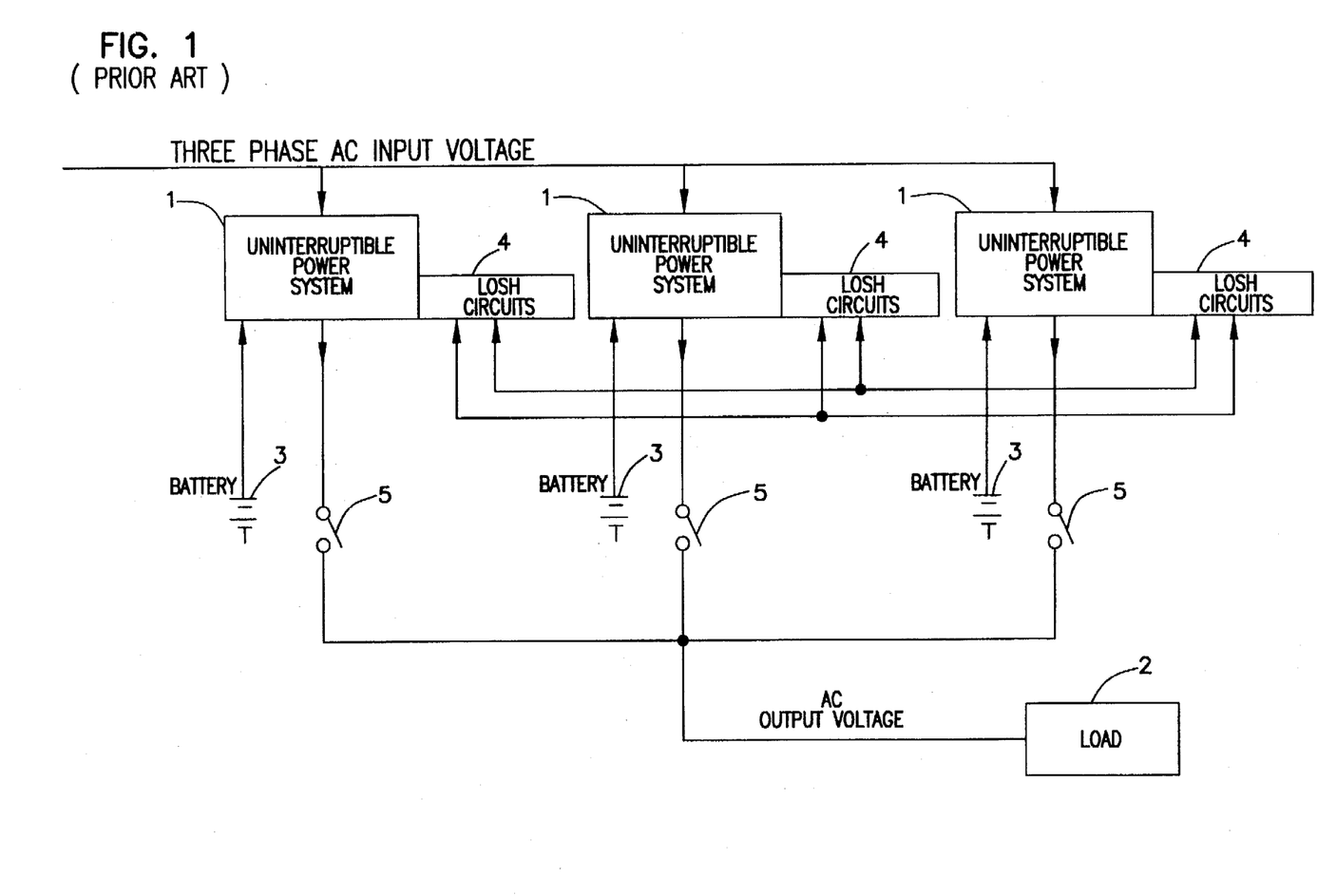
FIG. 1 illustrates a prior art parallel redundant configuration of uninterruptible power supplies in which synchronous and/or difference from average load sharing signals are communicated among the power supplies on shared busses.

As illustrated in FIG. 1, prior art parallel redundant power supply systems use inter-unit signaling to facilitate selective tripping. As illustrated in FIG. 1, a plurality of uninterruptible power systems (UPSs) 1 responsive to a three phase AC input voltage are connected in a parallel redundant capacity configuration to provide a constant AC output voltage to a load 2. Each UPS 1 is connected to a DC voltage source (battery) 3 in a conventional manner to provide constant power in the event of an AC power failure. As illustrated, load sharing circuits 4 are associated with each UPS 1 to facilitate inter-unit signaling and selective tripping using either a "difference from average" real time current signal on a "difference from average" bus, or a synchronizing signal provided on a synchronizing signal bus. Generally, if a fault is detected, the appropriate solid state or mechanical switch or relay 5 is thrown to remove the faulty UPS 1 from the power circuit, thereby maintaining a constant AC output voltage on the load 2.

Using "difference from average" load sharing or common synchronization signal load sharing is common practice. In the case of "difference from average" load sharing, for example, a real-time current signal is used as an inter-unit signal amongst the parallel redundant UPSs. Unfortunately, the use of such inter-unit signaling is vulnerable to interruption and hence must be redundant itself to provide a robust selective tripping regime. Since prior art systems use inter-unit signaling for selective tripping, then there should be a redundant selective tripping scheme so that the inter-unit signaling itself does not become a single failure point of the otherwise redundant system.

Another common practice in the prior art is to vectorially add the "difference from average" real-time current signal to the UPS's own voltage signal to create a biased voltage signal. This vector addition is done in such a way that the "biased" voltage distortion on the failed unit is accentuated compared to the unbiased voltage while the same signal is less severe on the good unit(s). However, this method requires both signal comparison and logical processing to make the final determination of whether a unit is "good" or "bad". While this method is usually adequate, the response may be slow due to the weakness of the difference. Also, this method must also rely on externally derived information such as the "difference from average" signal. Such additional signaling and the additional internal circuits required by the prior art parallel redundant power systems for identifying a faulty unit have had an adverse impact on reliability. A more reliable technique for identifying and "selectively tripping" a faulty unit is desired.

SUMMARY OF THE INVENTION

The present invention solves the afore-mentioned problems in the prior art by providing a parallel redundant power supply system which does not use any inter-unit signaling. Instead, all information necessary for a robust selective trip regime is derived from signals each power system already has. In particular, the invention creates a trip function by multiplying an instantaneous difference in voltage (compared with the previous cycle) with the instantaneous difference in current (also compared with the previous cycle) output by the power system. Such a technique is similar to multiplying a difference from average voltage by a difference from average current. Such a technique is also similar to the vector addition technique of the prior art except that both voltage and current are "difference from average" and the values are multiplied rather than added. However, as will be apparent from the following, these differences permit the creation of a strong, fast indication of whether a particular power supply unit is "good" or "bad". In short, the trip function alone distinguishes a "bad" unit and needs no other logical processing. As a result, no additional selective tripping circuitry is required which will adversely impact on reliability. Furthermore, for a multi-phase system (such as split phase or 3 phase), there is a natural redundancy in the signal processing itself, thereby avoiding the afore-mentioned "single point" failures in the inter-unit signaling systems of the prior art.

The present invention relates to a single power system which provides AC power to a load or a parallel redundant power system in which a plurality of parallel-connected power systems provide AC power to a load. In each case, the power system performs self-monitoring of its power output and disconnects itself from the load upon detection of a failure. Such removal is accomplished by sending a trip signal to a disconnecting means such as a switch or relay in the power connection connecting the power system to the load.

In a preferred embodiment of the invention, each power system, operating alone, or in parallel redundant fashion with one or more additional power systems, comprises means for generating an AC output voltage, means for sampling the AC output voltage to provide AC current samples and AC voltage samples, means for storing at least a cycle of the AC current samples and AC voltage samples, means for determining a current transient as a difference between an AC current sample from the sampling means and an AC current sample at a corresponding point of a previous AC current cycle stored in the storing means and for determining a voltage transient as a difference between an AC voltage sample from the sampling means and an AC voltage sample at a corresponding point of a previous AC voltage cycle stored in the storing means, and means for generating the trip signal when the current transient and the voltage transient both increase or both decrease in value by predetermined amounts. The stored AC voltage and current samples may be samples from the immediately preceding AC output power cycle or averaged AC current samples and AC voltage samples for corresponding points of previous cycles of the AC current samples and AC voltage samples. The trip signal generating means multiplies the current transient by the voltage transient and generates the trip signal when the multiplicative product of the current transient and the voltage transient is positive, for a positive result is indicative of failure of the power system. On the other hand, if the multiplicative product of the current transient and the voltage transient is negative, no trip signal is generated, for a negative result is indicative of proper operation of the power system.

In an alternative embodiment of the power system, each power system comprises means for generating an AC output voltage, means for calculating a rectified sum average of the AC output voltage and a power sum of output phases of the AC output voltage, a first filter having a relatively short time constant for filtering the rectified sum average and the power sum, a second filter having a relatively long time constant for filtering the rectified sum average and the power sum, means for determining a power transient as a difference between a filtered power sum respectively output by the first and second filters and for determining a voltage transient as a difference between a filtered rectified sum average respectively output by the first and second filters, and means for generating the trip signal when the power transient and the voltage transient both increase or both decrease in value by predetermined amounts. As in the first embodiment, the trip signal generating means multiplies the power transient by the voltage transient and generates the trip signal when the multiplicative product of the power transient and the voltage transient is positive.

The scope of the invention also encompasses a method of generating a trip signal for disconnecting a failed power system from a load to which the power system provides AC power. In accordance with a preferred method of operation, the trip signal is generated by performing the steps of:

sampling an AC output voltage from the power system to provide AC current samples and AC voltage samples;

storing at least a cycle of the AC current samples and the AC voltage samples;

determining a current transient as a difference between a present AC current sample and a previously stored AC current sample at a corresponding point of a previous AC current cycle;

determining a voltage transient as a difference between a present AC voltage sample and a previously stored AC voltage sample at a corresponding point of a previous AC voltage cycle; and generating the trip signal when the current transient and the voltage transient both increase or both decrease in value by predetermined amounts.

Preferably, the trip signal generating step comprises the steps of multiplying the current transient by the voltage transient and generating the trip signal when the multiplicative product of the current transient and the voltage transient is positive. No trip signal is generated when the multiplicative product is negative.

An alternative method in accordance with the invention of generating a trip signal for disconnecting a failed power system from a load to which the power system provides AC power, comprises the steps of:

calculating a rectified sum average of an AC output voltage provided by the power system;

calculating a power sum of output phases of the AC output voltage provided by the power system;

filtering the rectified sum average and the power sum using a first filter having a relatively short time constant;

filtering the rectified sum average and the power sum using a second filter having a relatively long time constant;

determining a power transient as a difference between a filtered power sum respectively output by the first and second filters;

determining a voltage transient as a difference between a filtered rectified sum average respectively output by the first and second filters; and generating the trip signal when the power transient and the voltage transient both increase or both decrease in value by predetermined amounts.

As in the first method, the trip signal generating step preferably comprises the steps of multiplying the power transient by the voltage transient and generating the trip signal when the multiplicative product of the power transient and the voltage transient is positive.

In either embodiment, the power system performs self-monitoring and provides "selective tripping" when it determines that its own performance is indicative of failure. Since a power system's performance is compared with its own past performance instead of that of other power systems, selective tripping is possible without requiring inter-unit signaling as in the prior art. The technique described herein is applicable to multi-phase, single phase, and split-phase AC power systems.

BRIEF DESCRIPTION OF THE DRAWINGS

The above and other objects and advantages of the invention will become more apparent and will be more readily appreciated from the following detailed description of the presently preferred exemplary embodiments of the invention taken in conjunction with the accompanying drawings, of which:

FIGS. 5A–5D together illustrate a selective trip example in accordance with the invention, where FIG. 5D illustrates how a "good" and faulted UPS may be differentiated using the techniques of the invention.

DETAILED DESCRIPTION OF THE PRESENTLY PREFERRED EMBODIMENTS

The present invention will be described in detail below with respect to FIGS. 2–6. Those skilled in the art will appreciate that the description given herein is for explanatory purposes only and is not intended to limit the scope of the invention. For example, while the invention is described in connection with uninterruptible power systems (UPSs), the techniques of the invention may also be applied to other types of power systems as well. Also, while the invention is disclosed in connection with a three phase AC power system, the techniques of the invention may also be used for a DC or a single phase or split-phase AC power system. Accordingly, the scope of the invention is only to be limited by the scope of the appended claims.

The present invention is designed for use with an uninterruptible power system (UPS) which is controlled by a microprocessor or microcontroller. Accordingly, the control hardware has the ability to digitize input analog signals, to perform mathematical manipulations and comparisons using the digital data, and to provide control outputs based on those manipulations and comparisons. A person skilled in the art of writing embedded code for a microcomputers or microcontrollers and familiar with digital signal processing (DSP) techniques should have no difficulty implementing the invention as described below.

Although those skilled in the art will appreciate that the present invention is targeted for use with alternating current (AC) devices, the invention will be described in connection with direct current (DC) devices since the DC description is easier to understand. Once the DC description is understood, the AC operation will become apparent if the AC implementation is simply thought of as a fast changing DC implementation. In actual practice, the action taken is in a short (sub cycle) time frame where the DC description holds quite well.

A normal power source may have to deliver excessive current as a normal part of its function. Such excessive current may be caused by an inrush or start up requirement of some downstream load, or it may be due to a short circuit that will soon be cleared by a fuse or circuit breaker. This transient increase in current is generally coupled with a transient decrease in voltage due to the supply impedance. Accordingly, during normal operation, a transient increase in current coincides with a transient decrease in voltage. As will be noted in more detail below, the fact that the multiplicative product of the transient increase in current and the transient decrease in voltage is negative for a normal power source can be used for selective tripping of faulty power sources.

In the case of two power sources connected in parallel to the same lead, on the other hand, if one power source fails, it may cause the other power source to deliver excessive current in the manner just described. However, the failed source may fail in such a way that it tries to increase the voltage rather than demand excessive current from the good unit. When the good unit sees this transient increase in voltage, its current will be reduced or even reversed. Thus, if this transient increase in voltage is multiplied by the transient decrease in current, the result again would be negative. As before, the multiplication of the voltage and current transients produces a negative result for a good power supply during normal operation.

If it is now assumed that a bad power supply is connected in parallel with a good power supply, a different result is obtained for the bad power supply. If the bad power supply fails in such a way that it represents an excessive load, then its current will decrease or be back fed as it pulls the voltage down. If this transient decrease in current is multiplied by the transient decrease in voltage, the result would be positive. Now, on the other hand, if the failure was such that the bad power supply tried to deliver excessive voltage, then it would also take on a larger share of the load and its current would increase. In this latter case, if this transient increase in voltage is multiplied by the transient increase in current, the result again would be positive.

This transient multiplication, just described, clearly creates a differentiating "trip" signal that can be used to trip a failed UPS off-line. More importantly, this "trip" signal will never deceive a good UPS into tripping off-line in response to a harsh normal or abnormal stimulus.

Figure 2:
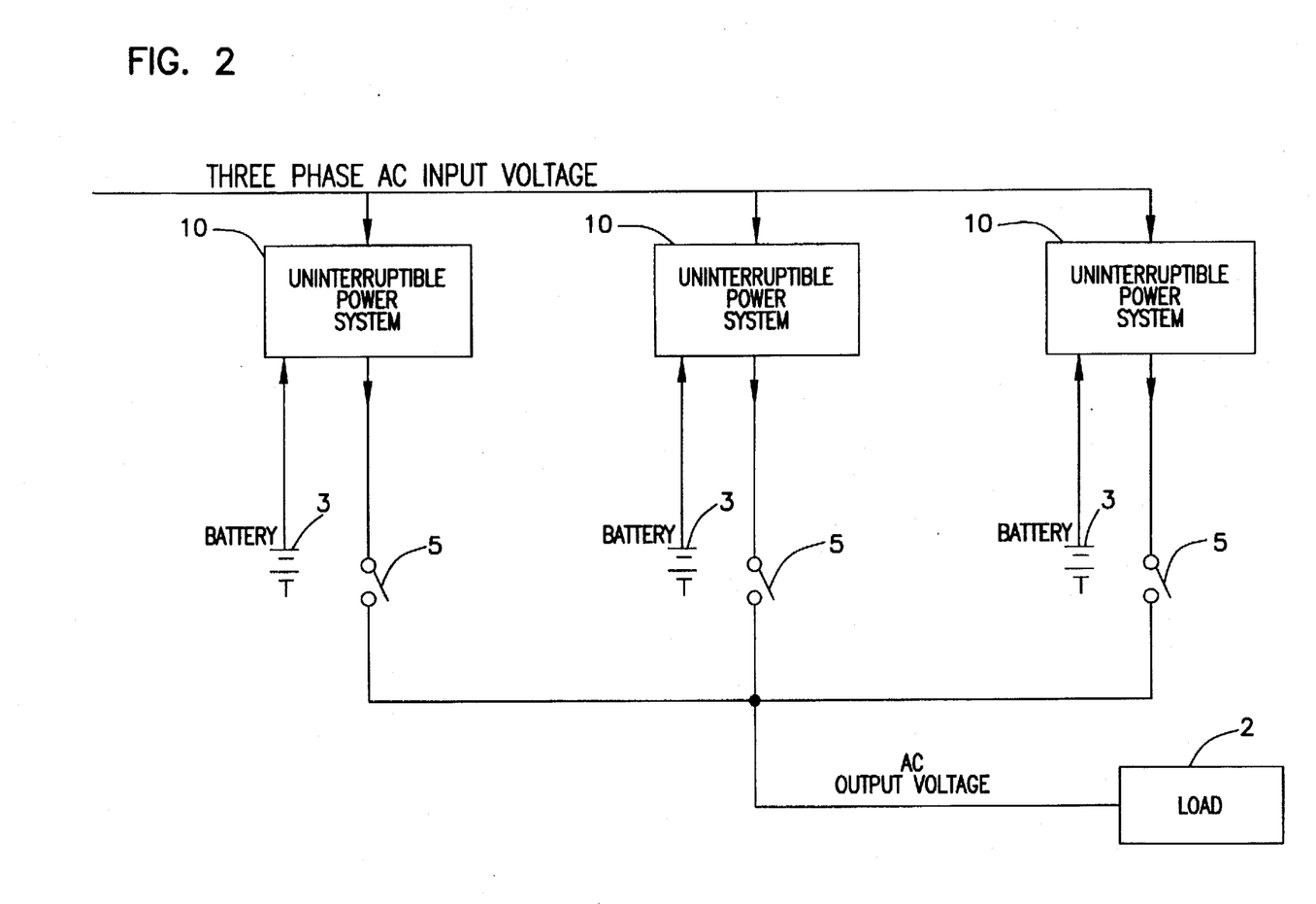
FIG. 2 illustrates a parallel redundant configuration of uninterruptible power supplies in accordance with the invention in which no inter-unit communication is necessary for selective tripping.

FIG. 2 illustrates a parallel redundant configuration of uninterruptible power supplies in accordance with the invention. As illustrated in FIG. 2, no inter-unit communication is necessary for selective tripping. Instead, each UPS 10 monitors its own power output and provides a selective trip signal to solid state or mechanical switch or relay 5 when the multiplicative product of the transient current and transient voltage is positive. The technique for generating this selective trip signal will be described in more detail below with respect to FIGS. 3–6.

Figure 3:
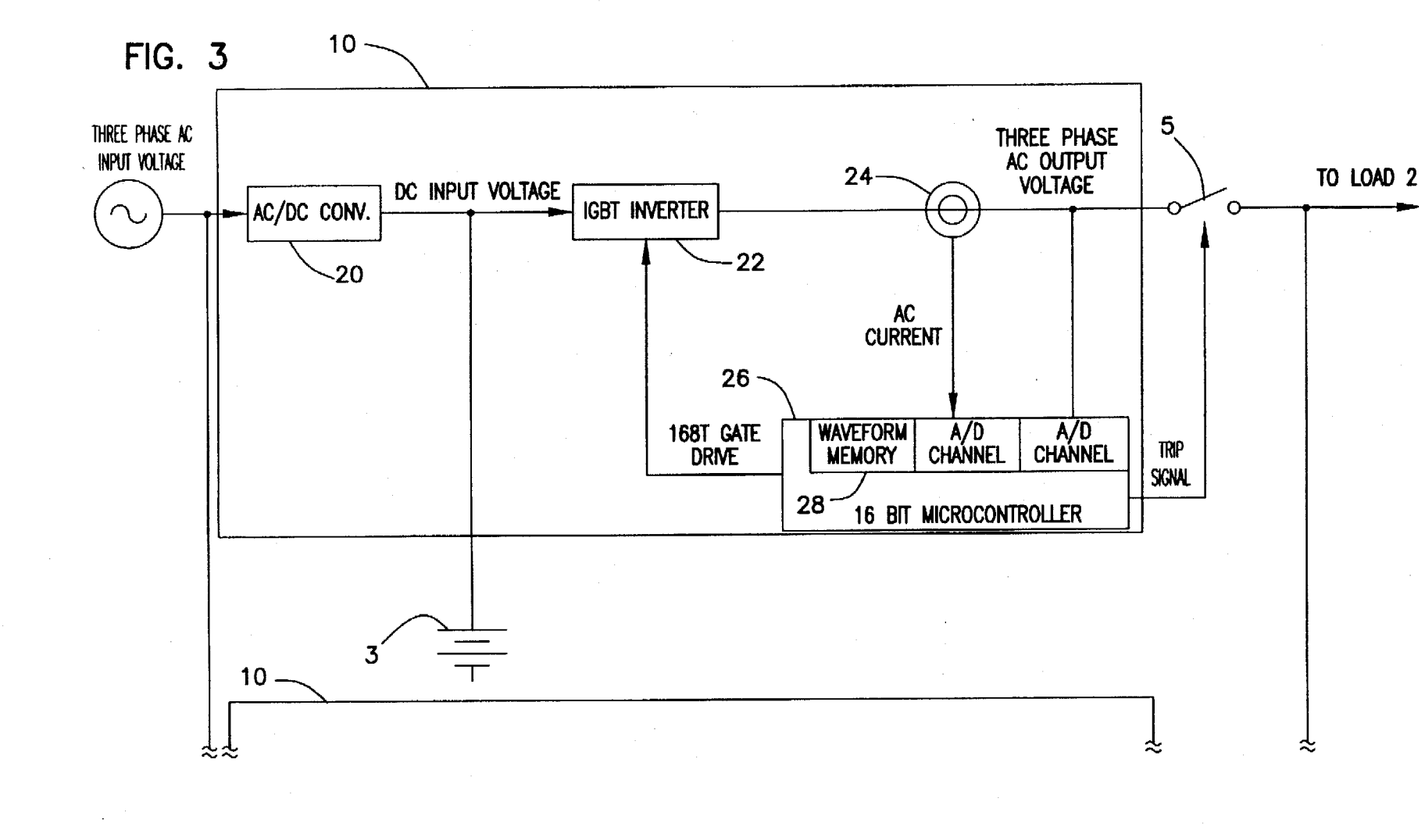
FIG. 3 illustrates a preferred embodiment of an uninterruptible power system 10 in accordance with the invention.

FIG. 3 illustrates a preferred embodiment of an uninterruptible power system 10 in accordance with the invention, whereby no inter-unit signaling is necessary for providing a selective tripping function. As illustrated, the three phase AC input voltage is provided to an AC/DC converter 20, where it is converted to a DC input voltage. Alternatively, in the event of an AC power failure, the DC input voltage may be provided directly by battery 3. The DC input voltage is then converted into a three phase AC output voltage by IGBT inverter 22. The three phase AC output voltage is then supplied to load 2 via an output power connection including a closed switch or relay 5.

The selective tripping technique of the invention is implemented by providing a current transformer 24 which is connected to the output terminal of the IGBT inverter 22 so as to detect the AC output current flowing from the IGBT inverter 22 to the load 2. The detected AC current and AC voltage signals are then provided to respective A/D converter channels of a 16-bit microcontroller 26. In a preferred embodiment, microcontroller 26 digitizes the AC output currents ($I_a$, $I_b$, $I_c$) and voltages ($V_a$, $V_b$, $V_c$) at a 3 kHz rate. For a 60 Hz UPS 10, this amounts to 50 samples per cycle.

In a preferred embodiment of the invention, microcontroller 26 keeps a rolling image record of each past cycle of the AC output power signal. In the case of a 3 kHz sampling rate, for example, at least the last 50 samples, and preferably more, are stored in a waveform memory 28 of microcontroller 26. This stored image may be an average record of past waveforms using common DSP techniques on each point of the cycle, or it may be simply the last cycle of the AC output power signal. Thus, every time an AC current or voltage signal is digitized, it is saved to the waveform memory 28. Then, each received digitized AC current or voltage signal is subtracted from the digitized AC current or voltage signal of exactly one cycle ago to yield a waveform transient value. As noted above, when a voltage transient and a current transient of the same phase are multiplied together, a selective "trip" signal may be obtained. In the preferred implementation, the multiplication product signal is processed a little more by adding the three phases together, dividing the sum by the UPS power rating (to normalize the result to 1), and filtering the normalized result with a simple IIR filter implemented in software in the microcontroller 26 and described below. Thus, an IGBT inverter 22 running at full voltage and half load would have a voltage of 1.0 and a current of 0.5. These normalized signals are processed to provide the selective trip function based on output voltage, current, and frequency.

The selective tripping signal of the invention is ideally generated only when an output voltage disturbance is self-caused. Whether the disturbance is self-caused is determined in a preferred embodiment by microcontroller 26 by following the flow chart illustrated in FIG. 4. Preferably, the flow chart of FIG. 4 is implemented in firmware of microcontroller 26, although those skilled in the art will appreciate that the flow chart of FIG. 4 may be implemented in software or special purpose hardware as desired.

Figure 4:
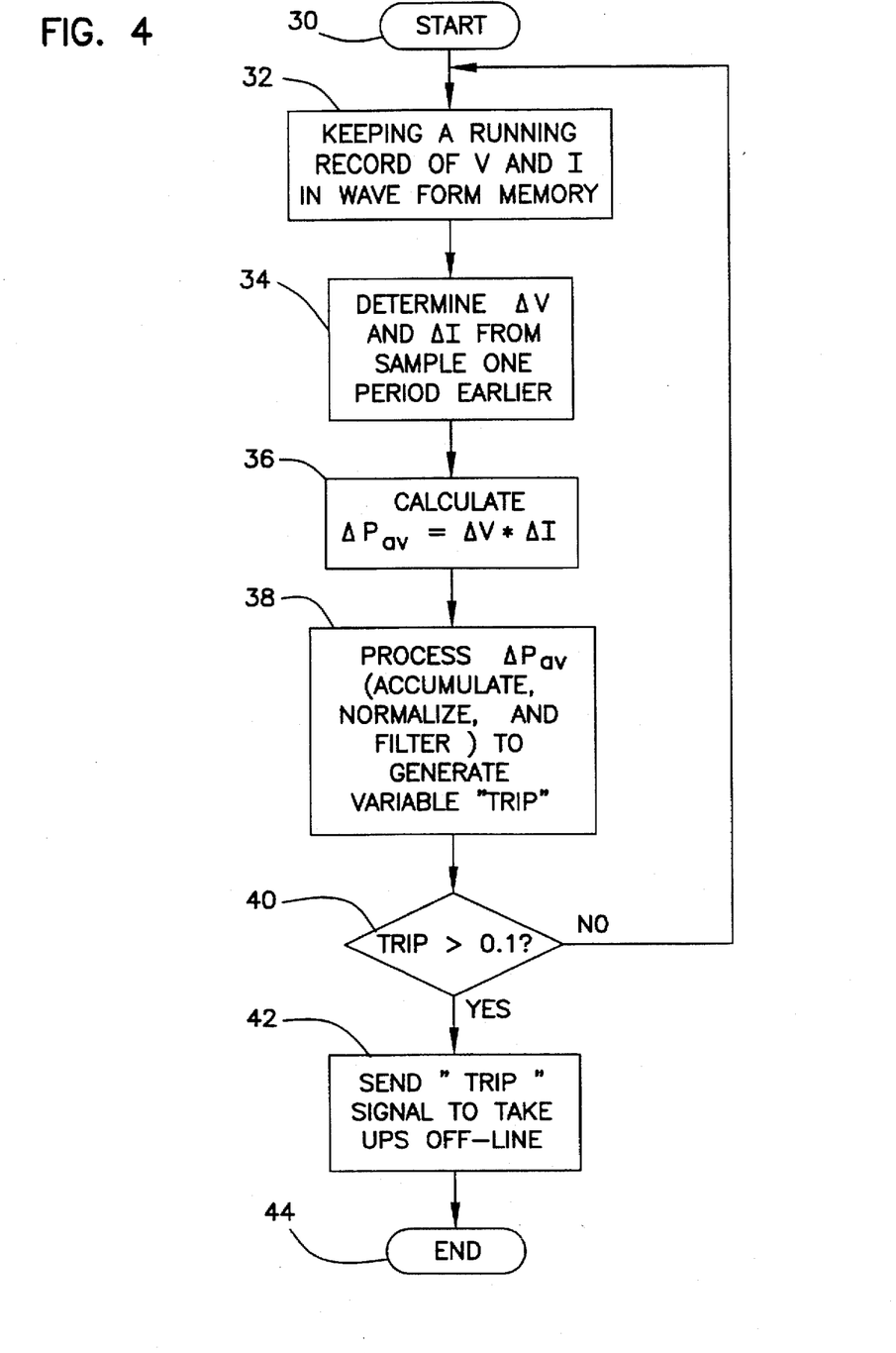
FIG. 4 illustrates a flow chart of the operation of a preferred embodiment of the microcontroller 26 of the uninterruptible power system 10 illustrated in FIG. 3.

As shown in FIG. 4, upon receipt of current and voltage samples from the A/D channels, the microcontroller 26 starts the selective trip routine at step 30. The most recently received current and voltage samples are stored in waveform memory 28 at step 32. In a preferred embodiment, running records of the past 128 samples of each of the current and voltage readings are maintained, which, at a 3 kHz sampling rate, represents over two complete cycles of a 60 Hz sine wave. Generally, waveform memory 28 functions as a FIFO memory. Based on the sampling rate, the period of the current and voltage waveforms is calculated as a number of samples. As noted above, a 60 Hz wave sampled at 3 kHz would have a period of 50 samples. Then, at step 34, a "delta voltage" ($\Delta V$) and a "delta current" ($\Delta I$) are created from the received voltage and current samples by subtracting the corresponding sample of exactly one period earlier. For example, $\Delta V_a = Va_n - Va_{n-50}$; $\Delta I_a = Ia_n - Ia_{n-50}$, etc., where $Va_n$ is the received voltage sample, $Va_{n-50}$ is the voltage sample from exactly one period earlier, Ian is the received current sample, and $Ia_{n-50}$ is the current sample from exactly one period earlier. The values for the other signal phases are similarly calculated. At step 36, a "delta power average" value ($\Delta P_{av}$) is calculated by multiplying and adding the values calculated in step 34. Namely:

$$\Delta P_{av} = \Delta V_a * \Delta I_a + l\Delta V_b * \Delta I_b + \Delta V_c * \Delta I_c$$

Then, at step 38, $\Delta P_{av}$ is preferably accumulated, normalized, and filtered with a simple IIR filter to generate a variable "TRIP." For example, $TRIP_n$ may be defined as:

$$TRIP_n = (3*TRIP_{n-1} + \Delta P_{av})/4$$

where $TRIP_{n-1}$ is the TRIP value of the previous sample. If it is determined at step 40 that the "TRIP" value reaches a predetermined normalized magnitude, such as +0.1, then control proceeds to step 42 to generate a trip signal. Otherwise, the system returns to step 32 to process the next set of samples. If the value of TRIP is greater than +0.1, then a "unit trip" signal is immediately issued at step 42 so that the UPS 10 can be taken off-line before further degradation of the critical output bus occurs. The system then exits at step 44. Those skilled in the art will appreciate that if the "TRIP" value is determined at step 40 to be less than −0.1, then the disturbance is known to be caused by a different UPS connected in parallel to the present UPS. The present UPS is thus kept on-line, and the "good" indication is used to temporarily desensitize the "trip" functions of the "good" UPS. Control then returns to step 32 to await the next set of current and voltage samples. Of course, the threshold may be set higher or lower as desired.

Those skilled in the art will appreciate that a robust selective tripping regime needs to alarm in response to its own inability to perform its intended function. Since the methods described herein do not actually control the power generation, their failure would not cause a failure of the critical mission. However, if a subsequent failure disturbed the critical output bus, then a real loss of mission could occur. Fortunately, detection of loss of function is easily accommodated by the present invention as follows.

A UPS typically monitors power at more than one node. For example, UPS 10 may know the power both going into and out of the IGBT inverter 22. The relationship of these two readings is known by design. If the output power sensing (voltage and current) are used to implement this "tripping" regime, then a loss of signal would render the regime inoperable. By simply comparing the power as determined by this node with some other means, say the DC link power going into the IGBT inverter 22, then a difference larger than the expected efficiency loss can be used to signal an alarm.

Considerable data to illustrate the operation of the invention has been collected using fault insertion techniques. FIGS. 5A–5D illustrate four respective plots of one such example where a simulated fault was inserted into the output of one UPS. For clarity, the plots show only a single phase rather than all-three. The basic data for these plots comes from the digitized record of each of two UPS's connected with their outputs in parallel. Each UPS kept a running record of its output voltage and current waveforms as described above. Various "faults" were then inserted in one of the UPSs and the record of the digitized waveforms was saved.

Figure 5A:
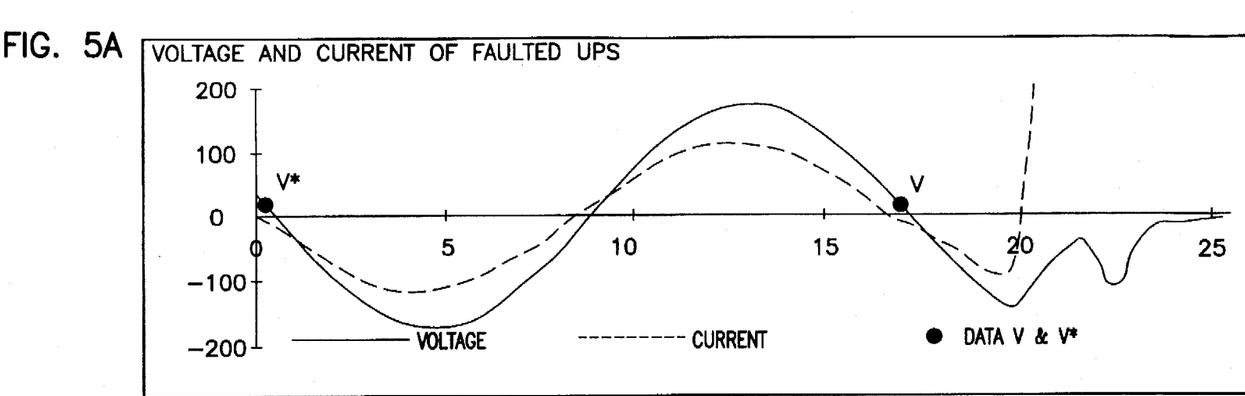
Figure 5B:
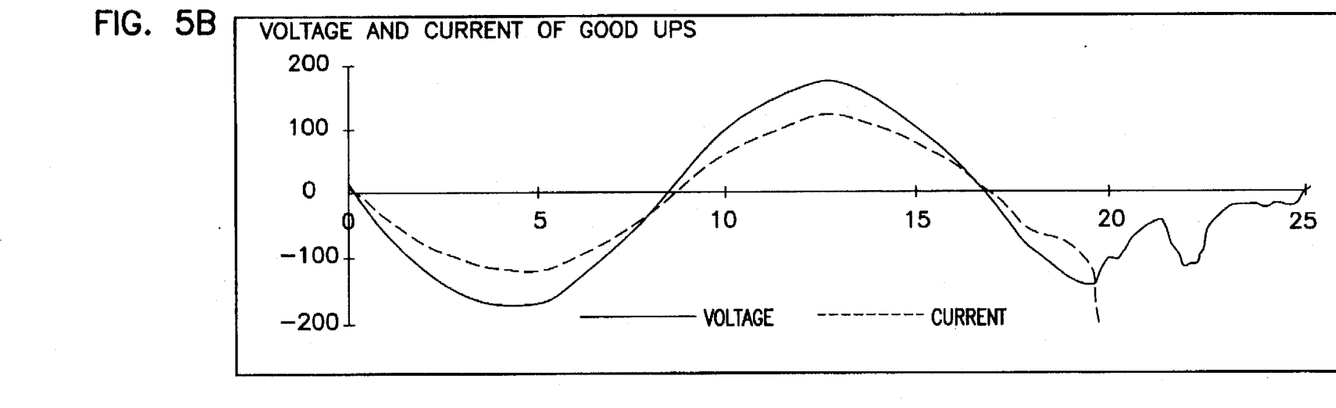

FIGS. 5A and 5B illustrate the saved voltage and current records of the faulted and non-faulted ("good") UPSs, respectively. As expected, their record of the voltage is the same since they are each digitizing the same bus voltage. Since they are also sharing current in a parallel redundant system, their current records are also the same up to the point of fault. The data point labeled "V" in FIG. 5A represents an arbitrary point on the digitized voltage waveform. The point "V*" represents a corresponding point exactly one cycle earlier. A "$\Delta V$" signal is created by subtracting "V*" from "V" as described above. This is done for every data point. A "$\Delta I$" signal is created in a similar manner.

Figure 5C:
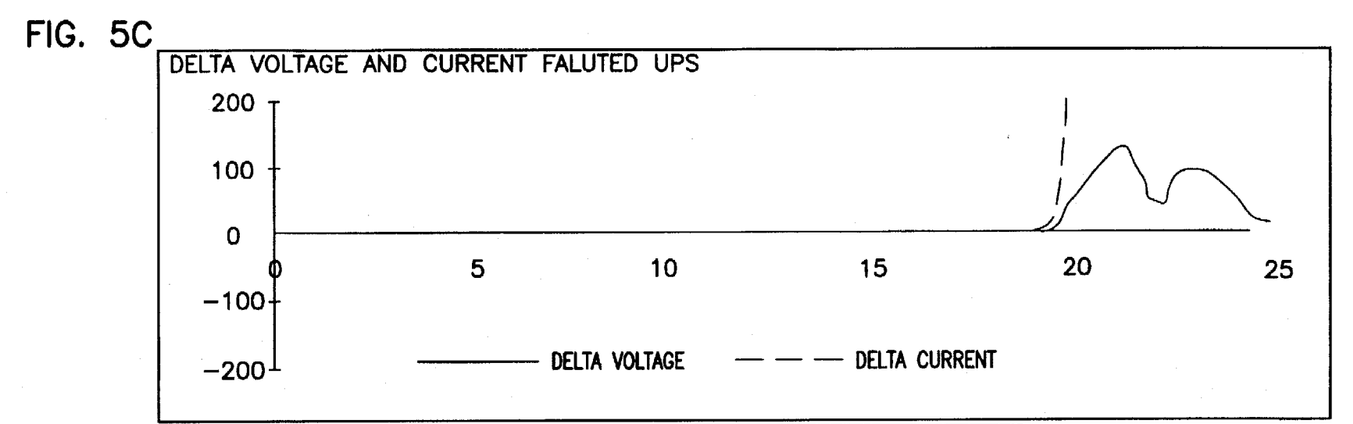

FIG. 5C shows the values of "$\Delta V$" and "$\Delta I$" created as described above for the faulted UPS. There is, of course, no need to save a record of these signals. $\Delta V$ (solid line) and $\Delta I$ (dashed line) are multiplied together and accumulated with a simple IIR filter to give the result a time constant of about 1.3 ms. The need for, and time constant of, the filter is somewhat arbitrary and is shown here by way of example.

Figure 5D:
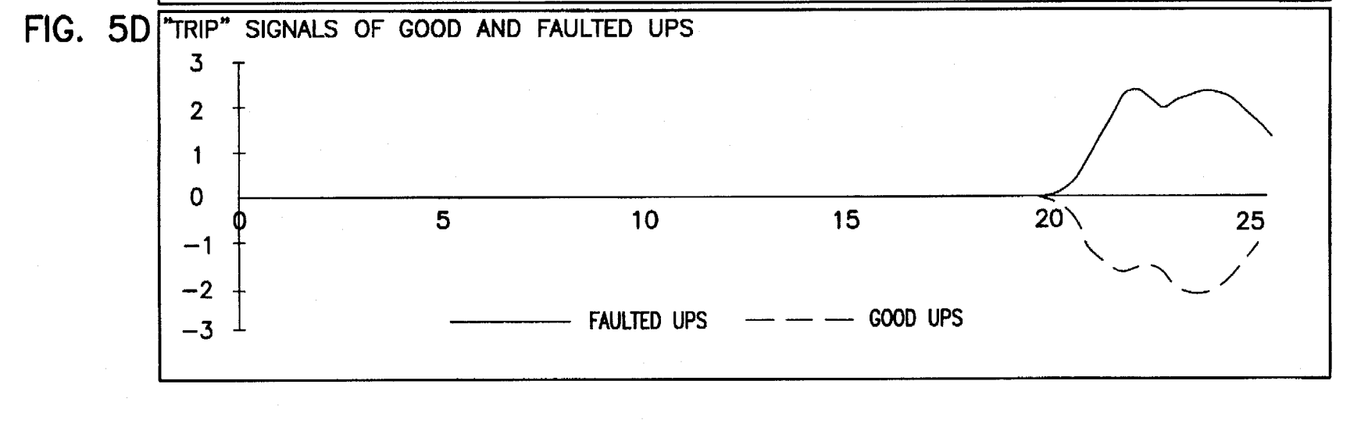

FIG. 5D shows the "TRIP" signals created by the faulted (solid line) and the good (dashed line) UPS. These "TRIP" signals were created as described above.

The distinctive difference between the signal from the faulted UPS and the good UPS makes it clear that the technique described herein provides a strong selective trip function.

In an alternative embodiment of the invention, the digitized voltage and current signals provided to the microcontroller 26 may be processed in ways that are more like analog signal processing. As will be appreciated by those skilled in the art, the description that follows works a little differently, but still produces a signal that can be used for tripping or to keep a good unit from misjudging the situation and trip in error. Such an embodiment may be implemented in analog hardware using resistors, capacitors, operational amplifiers, and analog multipliers. The method may also use DSP techniques using simple one tap IIR filters to simulate time constant filters.

Figure 6:
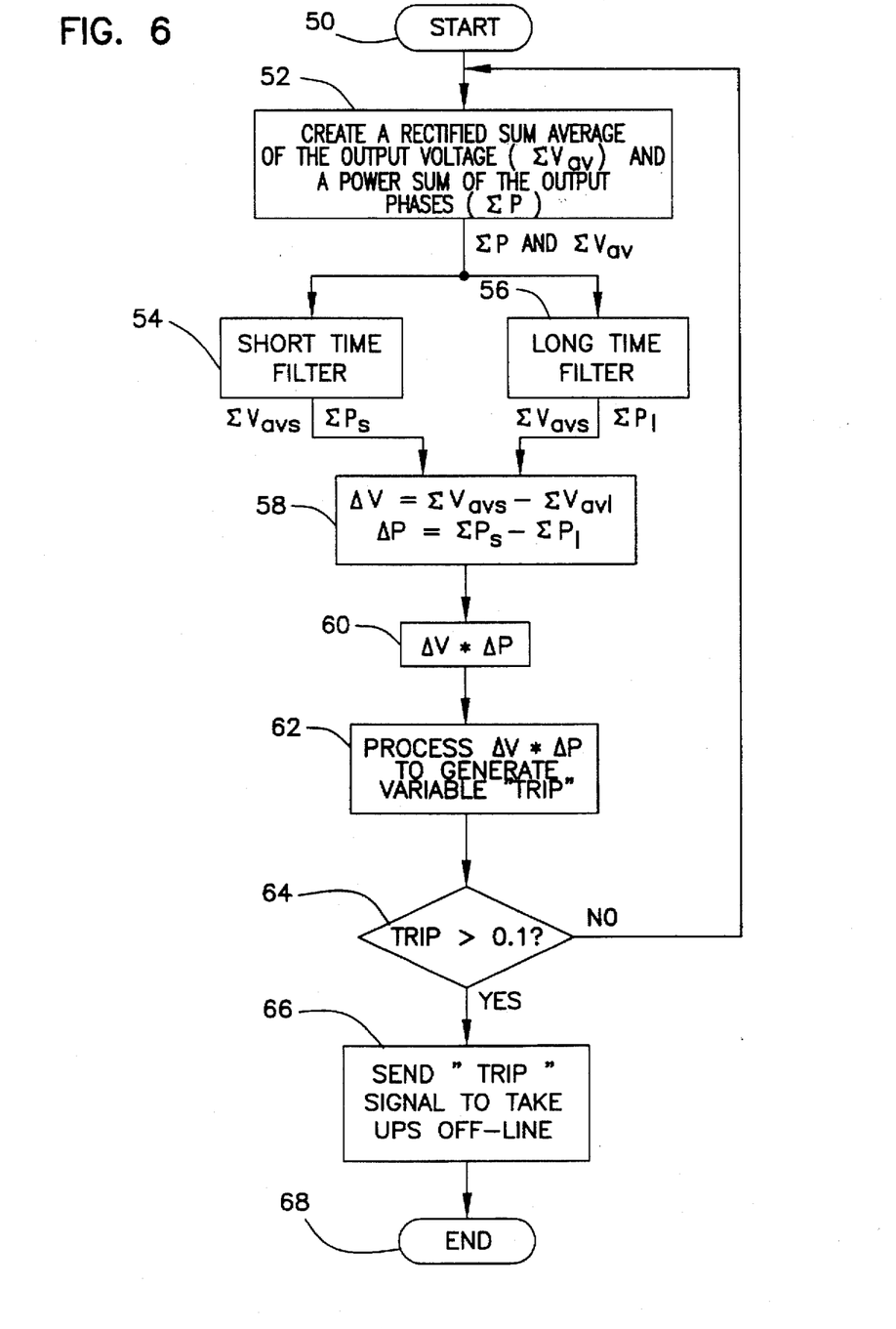
FIG. 6 illustrates a flow chart of the operation of an alternative embodiment of the microcontroller 26 of the uninterruptible power system 10 illustrated in FIG. 3.

FIG. 6 illustrates an alternative embodiment of the invention which is also implemented by microcontroller 26 in firmware, software, and/or hardware. As shown, the microcontroller 26 enters the alternative selective trip routine at step 50 and then creates a rectified sum average of the critical output voltage ($\Sigma V_{av}$) and a power sum of the output phase(s) ($\Sigma P$) at step 52. Both the "average" voltage and the power are separately filtered with a short time filter (say 1.5 ms) at step 54 and a long time filter (say 80 ms) at step 56 to yield filtered values $\Sigma V_{av,s}$ and $\Sigma P_s$ from the short time filter 54 and filtered values $\Sigma V_{av,l}$ and $\Sigma P_l$ from the long time filter 56. The output of the long time filter represents a "history" record of the power and voltage values. A transient signals of these two values (ΔV and ΔP) may be created by subtracting the long filter output from the short filter output at step 58, thereby forming a differentiator. As before, these two transients are then multiplied at step 60 and some filtering may be added to the result to generate a "TRIP" variable at step 62. The trip determination in steps 64 and 66 is then performed in the same manner as steps 40 and 42 of the embodiment of FIG. 4 before the routine is exited at step 68. As before, if the two transients are in opposite directions (one positive, and the other negative), then the product will be negative and indicative of a good unit. Likewise, if both are in the same direction, the product will be positive and indicative of a failed unit.

Those skilled in the art will appreciate that the alternative embodiment may be easier to implement when using DSP techniques since a record of waveform shape need not be maintained.

The present invention thus overcomes the limitations in the prior art by providing a selective trip function without requiring signals or communications among redundant AC power systems connected in parallel for selective tripping purposes or requiring externally generated information. Instead, the invention creates a selective "trip" signal entirely from the digitized information that the AC power system already has (namely, AC output voltage and current). This eliminates potential reliability problems and a major source of installation error.

The present invention also provides redundancy in the selective tripping regime, for whenever more than one phase of a multiphase system is monitored, redundant selective trip signals may be independently generated. The present invention also can be implemented in circuitry already present in a UPS. Since the circuitry is used for other purposes, there is an inherent check on its functionality. Moreover, the present invention uses signals not needed for normal UPS functions, thereby providing a means of check and balance. Also, the loss of "function" signals will not "mask" the selective trip feature. Conversely, the loss of the selective trip feature will not cause a loss of function. In short, the present invention provides a "selective tripping" method that looks back at itself to access a change in average and keeps a running average of its own performance rather than to compare itself with other units, thereby providing selective tripping without need for inter-unit signaling.

Wireless selective tripping coupled with the wireless load sharing techniques described in a related application entitled "Independent Load Sharing of AC Power Systems Connected in Parallel" filed by the same assignee on even date herewith enables a new class of applications where there is a need to parallel the output of AC power sources. Such applications may include: automatic reconfiguration of a power source array, self attachment of power sources in a solar farm, or automatic "Hot Tie" for low cost, low power UPSs.

Although exemplary embodiments of the invention have been described in detail above, those skilled in the art will readily appreciate that many additional modifications are possible in the exemplary embodiments without materially departing from the novel teachings and advantages of the invention. For example, the present invention may include means for detecting the loss of the selective trip feature. This may be done by using the same signal acquisition technique to calculate true power and comparing the true power with the power measured by a different means. In addition, the present invention may be used in conjunction with conventional techniques requiring mathematical generation of a "high speed", "sub cycle" signal that can be used to discriminate good from bad units in a parallel redundant UPS system. Accordingly, all such modifications are intended to be included within the scope of the invention as defined in the following claims.

I claim:

1. A power system for providing AC power to a load via a power connection, said power connection including means for disconnecting said power system from said load upon receipt of a trip signal, comprising:

means for generating an AC output voltage;

means for sampling said AC output voltage to provide AC current samples and AC voltage samples;

means for storing at least a cycle of said AC current samples and said AC voltage samples;

means for determining a current transient as a difference between an AC current sample from said sampling means and an AC current sample at a corresponding point of a previous AC current cycle stored in said storing means and for determining a voltage transient as a difference between an AC voltage sample from said sampling means and an AC voltage sample at a corresponding point of a previous AC voltage cycle stored in said storing means; and means for generating said trip signal when said current transient and said voltage transient both increase or both decrease in value by predetermined amounts.

2. A power system as in claim 1, further comprising means for averaging AC current samples and AC voltage samples for corresponding points of previous cycles of said AC current samples and said AC voltage samples and for storing the resulting averages in said storing means for use by said current transient and voltage transient determining means.

3. A power system as in claim 1, wherein said trip signal generating means multiplies said current transient by said voltage transient and generates said trip signal when the multiplicative product of said current transient and said voltage transient is positive.

4. A power system as in claim 1, wherein said AC output voltage generating means outputs a three phase AC output voltage signal to power said load.

5. A power system as in claim 1, wherein said AC output voltage generating means outputs one of a single phase and a split phase AC output voltage signal to power said load.

6. A power system for providing AC power to a load via a power connection, said power connection including means for disconnecting said power system from said load upon receipt of a trip signal, comprising:

means for generating an AC output voltage;

means for calculating a rectified sum average of said AC output voltage and a power sum of output phases of said AC output voltage;

a first filter having a relatively short time constant for filtering said rectified sum average and said power sum;

a second filter having a relatively long time constant for filtering said rectified sum average and said power sum;

means for determining a power transient as a difference between a filtered power sum respectively output by said first and second filters and for determining a voltage transient as a difference between a filtered rectified sum average respectively output by said first and second filters; and means for generating said trip signal when said power transient and said voltage transient both increase or both decrease in value by predetermined amounts.

7. A power system as in claim 6, wherein said trip signal generating means multiplies said power transient by said voltage transient and generates said trip signal when the multiplicative product of said power transient and said voltage transient is positive.

8. A redundant power system comprising at least two power systems connected in parallel so as to provide AC power to a load via a common power connection, said common power connection including respective means for disconnecting each of said power systems from said load upon receipt of a trip signal from an associated power system, at least one of said at least two power systems comprising:

means for generating an AC output voltage;

means for sampling said AC output voltage to provide AC current samples and AC voltage samples;

means for storing at least a cycle of said AC current samples and said AC voltage samples;

means for determining a current transient as a difference between an AC current sample from said sampling means and an AC current sample at a corresponding point of a previous AC current cycle stored in said storing means and for determining a voltage transient as a difference between an AC voltage sample from said sampling means and an AC voltage sample at a corresponding point of a previous AC voltage cycle stored in said storing means; and means for generating said trip signal for the associated disconnecting means when said current transient and said voltage transient both increase or both decrease in value by predetermined amounts, whereby each power system generates a trip signal independent of the generation of a trip signal by each other power system.

9. A redundant power system as in claim 8, wherein each power system further comprises means for averaging AC current samples and AC voltage samples for corresponding points of previous cycles of said AC current samples and said AC voltage samples and for storing the resulting averages in said storing means for use by said current transient and voltage transient determining means.

10. A redundant power system as in claim 8, wherein said trip signal generating means multiplies said current transient by said voltage transient and generates said trip signal when the multiplicative product of said current transient and said voltage transient is positive.

11. A redundant power system as in claim 8, wherein said AC output voltage generating means outputs a three phase AC output voltage signal to power said load.

12. A redundant power system as in claim 8, wherein said AC output voltage generating means outputs one of a single phase and a split phase AC output voltage signal to power said load.

13. A redundant power system comprising at least two power systems connected in parallel so as to provide AC power to a load via a common power connection, said common power connection including respective means for disconnecting each of said power systems from said load upon receipt of a trip signal from an associated power system, at least one of said at least two power systems comprising:

means for generating an AC output voltage;

means for calculating a rectified sum average of said AC output voltage and a power sum of output phases of said AC output voltage;

a first filter having a relatively short time constant for filtering said rectified sum average and said power sum;

a second filter having a relatively long time constant for filtering said rectified sum average and said power sum;

means for determining a power transient as a difference between a filtered power sum respectively output by said first and second filters and for determining a voltage transient as a difference between a filtered rectified sum average respectively output by said first and second filters; and means for generating said trip signal for the associated disconnecting means when said power transient and said voltage transient both increase or both decrease in value by predetermined amounts, whereby each power system generates a trip signal independent of the generation of a trip signal by each other power system.

14. A redundant power system as in claim 13, wherein said trip signal generating means multiplies said power transient by said voltage transient and generates said trip signal when the multiplicative product of said power transient and said voltage transient is positive.

15. A method of generating a trip signal for disconnecting a power system from a load to which said power system provides AC power upon failure of said power system, comprising the steps of:

sampling an AC output voltage from said power system to provide AC current samples and AC voltage samples;

storing at least a cycle of said AC current samples and said AC voltage samples;

determining a current transient as a difference between a present AC current sample and a previously stored AC current sample at a corresponding point of a previous AC current cycle;

determining a voltage transient as a difference between a present AC voltage sample and a previously stored AC voltage sample at a corresponding point of a previous AC voltage cycle; and generating said trip signal when said current transient and said voltage transient both increase or both decrease in value by predetermined amounts.

16. A method as in claim 15, comprising the further steps of averaging AC current samples and AC voltage samples for corresponding points of previous cycles of said AC current samples and said AC voltage samples and storing the resulting averages for use in said current transient and voltage transient determining steps.

17. A method as in claim 15, wherein said trip signal generating step comprises the steps of multiplying said current transient by said voltage transient and generating said trip signal when the multiplicative product of said current transient and said voltage transient is positive.

18. A method of generating a trip signal for disconnecting a power system from a load to which said power system provides AC power upon failure of said power system, comprising the steps of:

calculating a rectified sum average of an AC output voltage provided by said power system;

calculating a power sum of output phases of said AC output voltage provided by said power system;

filtering said rectified sum average and said power sum using a first filter having a relatively short time constant;

filtering said rectified sum average and said power sum using a second filter having a relatively long time constant;

determining a power transient as a difference between a filtered power sum respectively output by said first and second filters;

determining a voltage transient as a difference between a filtered rectified sum average respectively output by said first and second filters; and generating said trip signal when said power transient and said voltage transient both increase or both decrease in value by predetermined amounts.

19. A method as in claim 18, wherein said trip signal generating step comprises the steps of multiplying said power transient by said voltage transient and generating said trip signal when the multiplicative product of said power transient and said voltage transient is positive.

* * * * *